United States Patent
Qian

(10) Patent No.: US 9,457,732 B2
(45) Date of Patent: Oct. 4, 2016

(54) DETACHABLE SEAT BACK HANGER ADAPTER

(71) Applicant: Shuhui Qian, Ningbo (CN)

(72) Inventor: Shuhui Qian, Ningbo (CN)

(*) Notice: Subject to any disclaimer, the term of this patent is extended or adjusted under 35 U.S.C. 154(b) by 0 days.

(21) Appl. No.: 14/611,279

(22) Filed: Feb. 2, 2015

(65) Prior Publication Data

US 2016/0221514 A1    Aug. 4, 2016

(51) Int. Cl.
*B60N 2/44* (2006.01)
*B60R 11/02* (2006.01)
*B60R 11/00* (2006.01)

(52) U.S. Cl.
CPC ............... *B60R 11/02* (2013.01); *B60R 11/00* (2013.01); *B60N 2002/4405* (2013.01); *B60R 2011/0017* (2013.01); *B60R 2011/0085* (2013.01)

(58) Field of Classification Search
USPC ......... 248/317, 323, 309.1, 351, 352, 354.1; 297/397, 398, 399, 400, 401
See application file for complete search history.

(56) References Cited

U.S. PATENT DOCUMENTS

| | | | |
|---|---|---|---|
| 2013/0107449 A1* | 5/2013 | Su | F16M 11/041 361/679.56 |
| 2013/0200119 A1* | 8/2013 | Ackeret | B60R 11/0235 224/275 |
| 2014/0015289 A1* | 1/2014 | Fan | B60N 3/004 297/188.05 |

FOREIGN PATENT DOCUMENTS

| | | | | |
|---|---|---|---|---|
| CH | 699303 A2 | * | 2/2010 | B60R 7/08 |
| CH | 701202 A2 | * | 12/2010 | B60N 2/4808 |
| DE | 102006055404 A1 | * | 5/2008 | B60N 2/4876 |
| JP | 2005067563 A | * | 3/2005 | B60N 2/4808 |

* cited by examiner

*Primary Examiner* — Alfred J Wujciak
(74) *Attorney, Agent, or Firm* — Pro-TECHTOR International Services; Ian Oglesby

(57) ABSTRACT

A seat back hanger adapter includes a securing unit having a main part with two end caps resiliently mounted to two ends of the main part. The main part is a hollow part and has an opening defined in one side thereof. A connection unit is inserted into the opening and has two hooking members received therein. A resilient member is biased between the two hooking members. Each of the hooking members has a button and a hooking portion, wherein the button protrudes from outside of the connection insertion, and the hooking portions are engaged with two notches in the main part. An organizer is pivotably connected to the connection unit. The connection unit is easily separated from the main part by pushing the buttons of the two connection members.

1 Claim, 6 Drawing Sheets

DETACHABLE SEAT BACK HANGER ADAPTER

BACKGROUND OF THE INVENTION

1. Fields of the Invention

The present invention relates to a seat back hanger adapter, and more particularly, to a detachable seat back hanger adapter.

2. Descriptions of Related Art

The conventional seat back organizer is designed for being connected to the back of the vehicle front seat so that the passengers at the rear seat can organize stuff in the organizer. The conventional seat back organizer is a back which has a loop and a storage unit, the loop is mounted to the headrest support rods of the front seat, and the storage unit may have multiple pockets for receiving goods.

One of conventional seat back organizers includes a securing unit, a support unit and a platform unit, wherein the securing unit is connected between the headrest support rods by resilient parts. The securing unit, the support unit and the platform unit are pivotably connected to each other. When in use, the user has to compress the resilient parts to remove the engaging members from the headrest support rods so as to detach the whole organizer from the front seat.

However, the resilient parts can easily reach their fatigue points after frequent use, so that the organizer cannot be securely connected to the headrest support rods. Furthermore, the distance between the headrest and the headrest support rods is small so that the installation and removal of the organizer is difficult and affect the people sitting in the front seat.

The present invention intends to provide a detachable seat back hanger adapter so as to eliminate the shortcomings mentioned above.

SUMMARY OF THE INVENTION

The present invention relates to a seat back hanger adapter and comprises a securing unit, connection unit and an organizer. The securing unit has a main part, two end caps and two first resilient members. The main part is a hollow part and has an opening defined in one side thereof. The main part has reception notches defined therein. Each of two ends of the main part has two protrusions respectively extending from two sides thereof. The two end caps each have a reception space and an open end respective defined in two ends thereof. The tow end caps are mounted to the two ends of the main part. Each open end of each end cap has two dents respectively defined in two insides thereof so as to accommodate the two protrusion of the main part. The two first resilient members are respectively located between the two ends of the main part and the two end caps which are biased by the two first resilient members.

The connection unit has a base which has a first notch and a second notch defied in each of two sides thereof. Two connection members are located in the connection unit and each connection member has a button and a hooking portion. A second resilient member is biased between the two connection members. The two respective buttons of the two connection members protrude from the two respective first notches, and the two respective hooking portions of the two connection members are respectively engaged with the second notches. A top board is connected to the top of the base. The connection unit is inserted into the opening of the main part, and the hooking portions are hooked with the reception notches of the main part. An organizer is pivotably connected to the connection unit.

Preferably, the main part includes a first part and a second part. The first part has a first recess defined in one side thereof. The second part has a second recess defined in one side thereof. The first part is connected to the second part. The first and second recesses are cooperated to form the opening.

Preferably, the first and second parts each have a semi-circular tubular portion extending from each of two ends thereof. The semi-circular tubular portions are cooperated with each other to form a tube on each of the two ends of the main part. Two ends of the first resilient member are mounted to the two tubes.

Preferably, the first and second members are springs.

Preferably, the base has two lugs extending from one end thereof. A pin is connected between the two lugs and the organizer is pivotably connected to the pin.

Preferably, the organizer is a hook which is pivotably connected to the pin.

Preferably, the organizer is a hanger which has a sleeve, the sleeve is pivotably connected to the pin.

Preferably, the organizer is an electronic product rack which is pivotably connected to the pin.

The primary object of the present invention is to provide a seat back hanger adapter wherein the connection unit is easily connected to and separated from the main part of the seat back hanger adapter.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
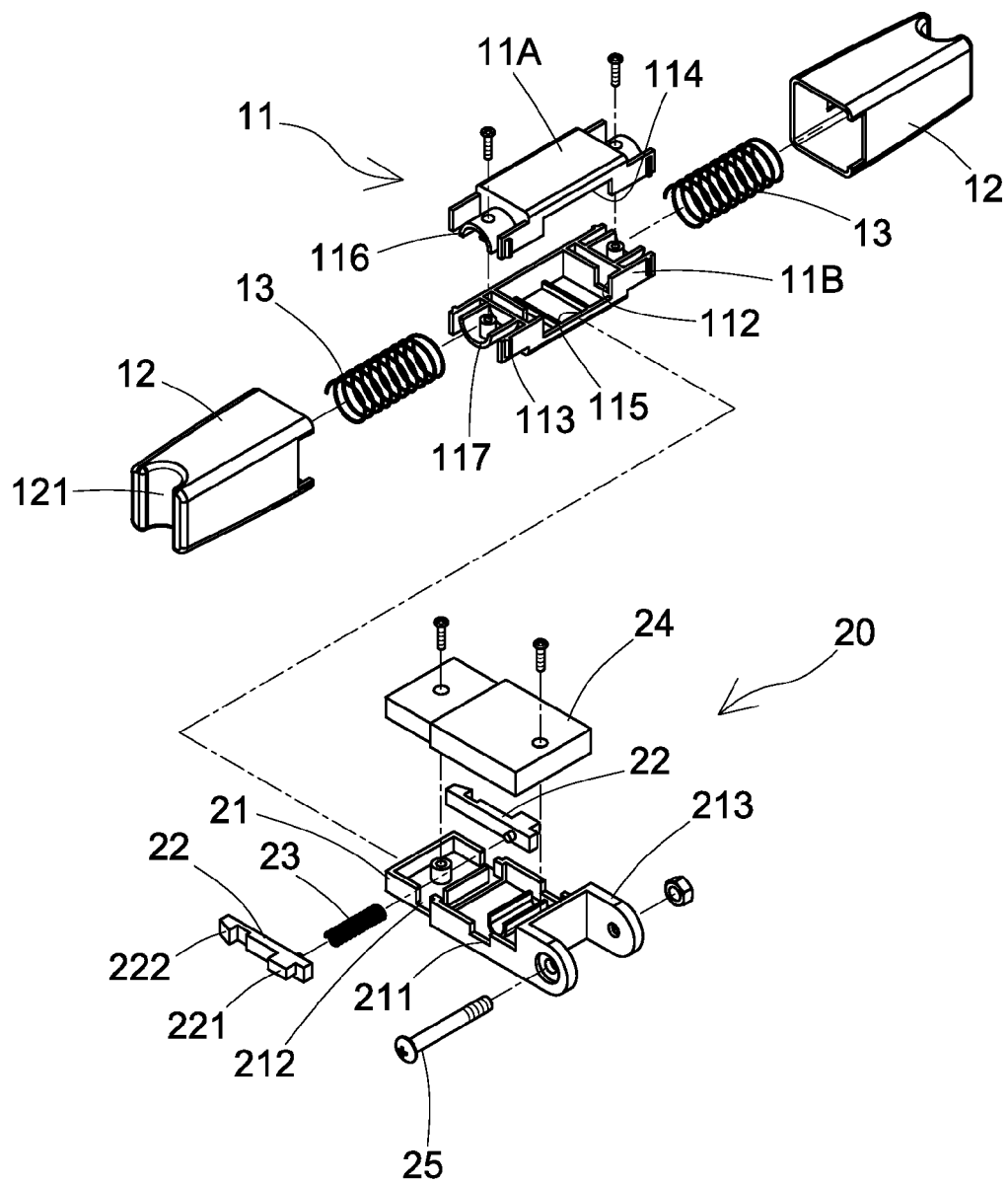
FIG. 1 is an exploded view of the seat back hanger adapter of the present invention.

Referring to FIGS. 1 to 6, the seat back hanger adapter of the present invention comprises a securing unit 10, a connection unit 20 and an organizer. The securing unit 10 comprises a main part 11, two end caps 12 and two first resilient members 13. The main part 11 is a hollow part and composed of a first part 11A and a second part 11B which is connected to the first part 11A. The first part 11A has a first recess 114 defined in one side thereof, and the second part 11B has a second recess 115 defined in one side thereof. The first and second recesses 114, 115 are cooperated to form an opening 111 defined in one side of the main part 11. The main part 11 has two interior boards located therein and each interior board has a reception notch 112. Each of two ends of the main part 11 has two protrusions 113 respectively extending from two sides thereof. Furthermore, the first and second parts 11A, 11B each have a semi-circular tubular portion 116/117 extending from each of two ends thereof. The semi-circular tubular portions 116, 117 are cooperated with each other to form a tube 118 on each of the two ends of the main part 11.

The two end caps 12 each have a reception space 121 defined in an outer end thereof, and the inner end of each end cap 12 is an open end so as to be mounted to one of the two ends of the main part 11. Each open end of each end cap 12 has two dents 122 respectively defined in two insides thereof so as to accommodate the two protrusion 113 of the main part 11. The two first resilient members 13 are respectively located between the two ends of the main part 11 and the two end caps 12 which are biased by the two first resilient members 13. In detail, the first and second members 13, 23 are springs, and the two ends of the first resilient member 13 are mounted to the two tubes 118.

Figure 2:
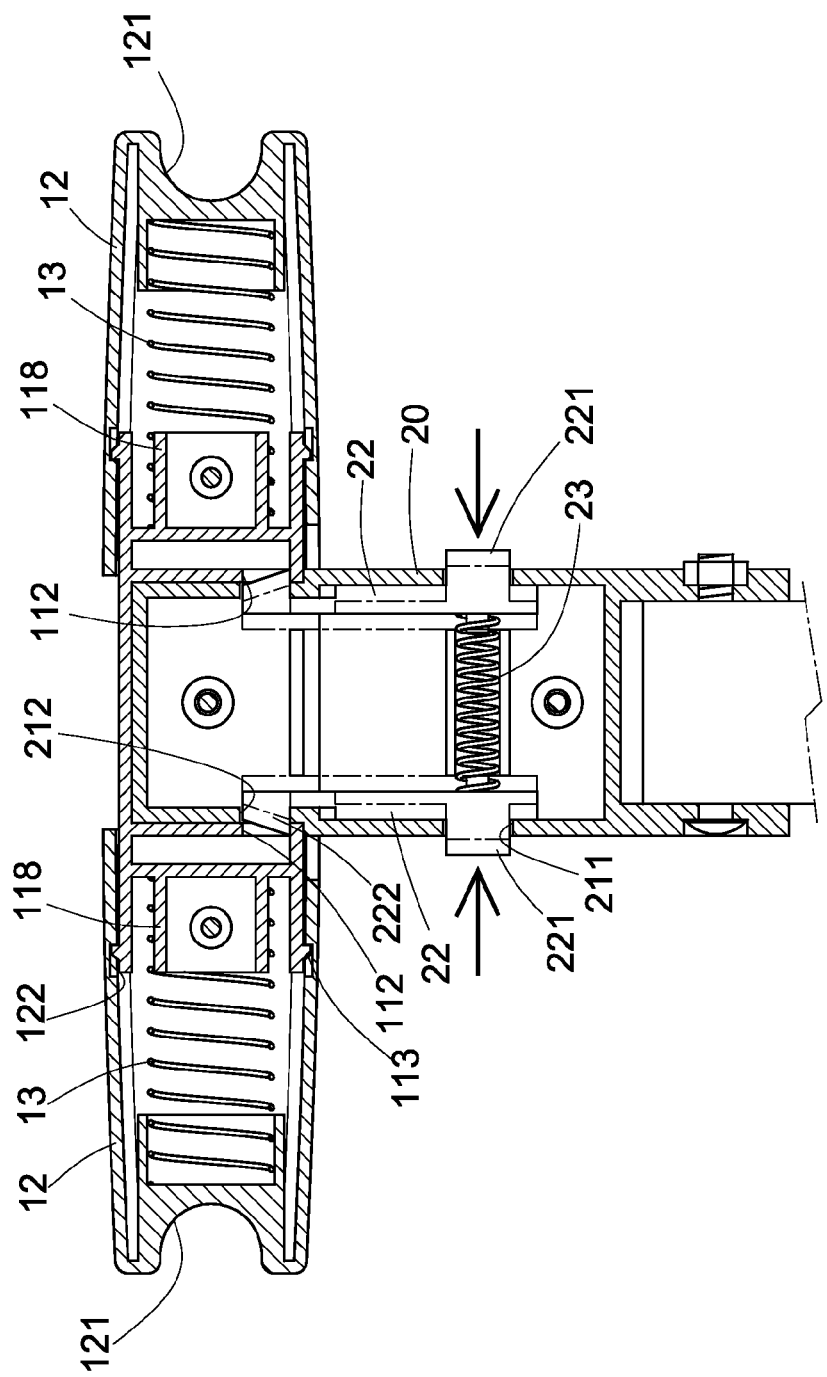
FIG. 2 is a cross sectional view to show the seat back hanger adapter of the present invention.

The connection unit 20 has a base 21 which has a first notch 211 and a second notch 212 defied in each of two sides thereof. Two connection members 22 are located in the connection unit 20 and each connection member 22 has a button and a hooking portion 222. A second resilient member 23 is biased between the two connection members 22. The two respective buttons 221 of the two connection members 22 protrude from the two respective first notches 211, and the two respective hooking portions 222 of the two connection members 22 are respectively engaged with the second notches 212 as shown in FIG. 2. A top board 24 is connected to the top of the base 21. The connection unit 20 is inserted into the opening 111 of the main part 11. The hooking portions 222 are hooked with the reception notches 112 of the main part 11. The base 21 has two lugs 213 extending from one end thereof. A pin 25 is connected between the two lugs 213 and an organizer is pivotably connected to the pin 25.

Figure 3:
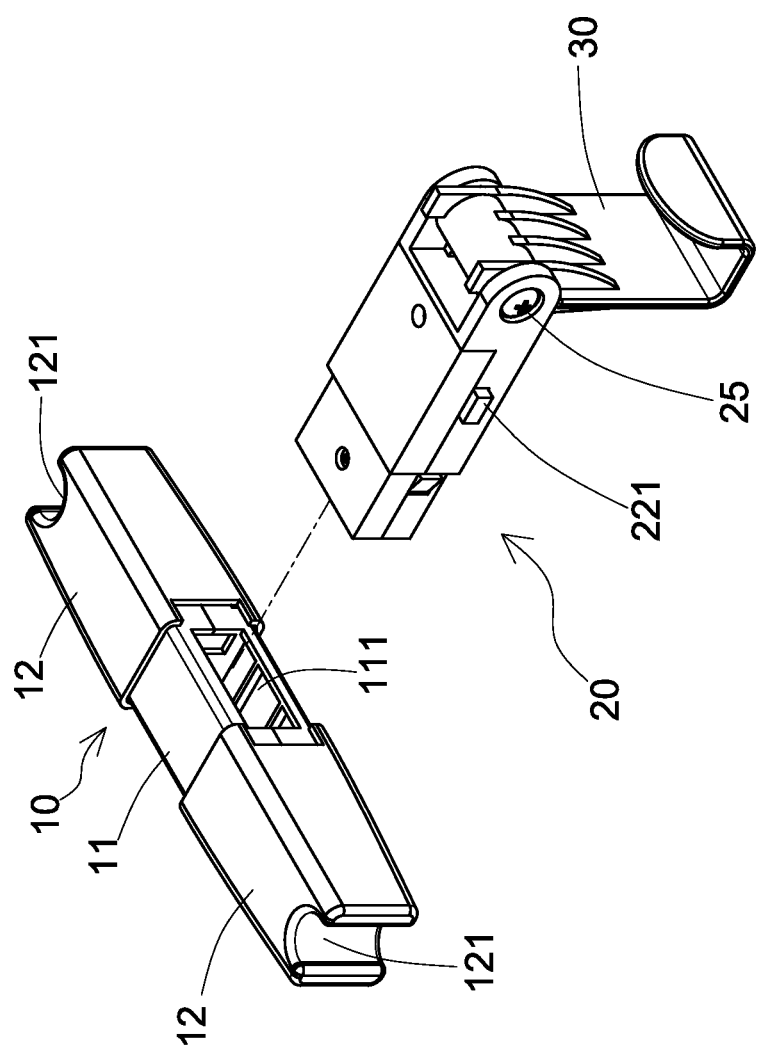
FIG. 3 is an exploded view to show that the organizer of the seat back hanger adapter of the present invention is a hook.

As shown in FIG. 3, the organizer is a hook 30 which is pivotably connected to the pin 25.

Figure 5:
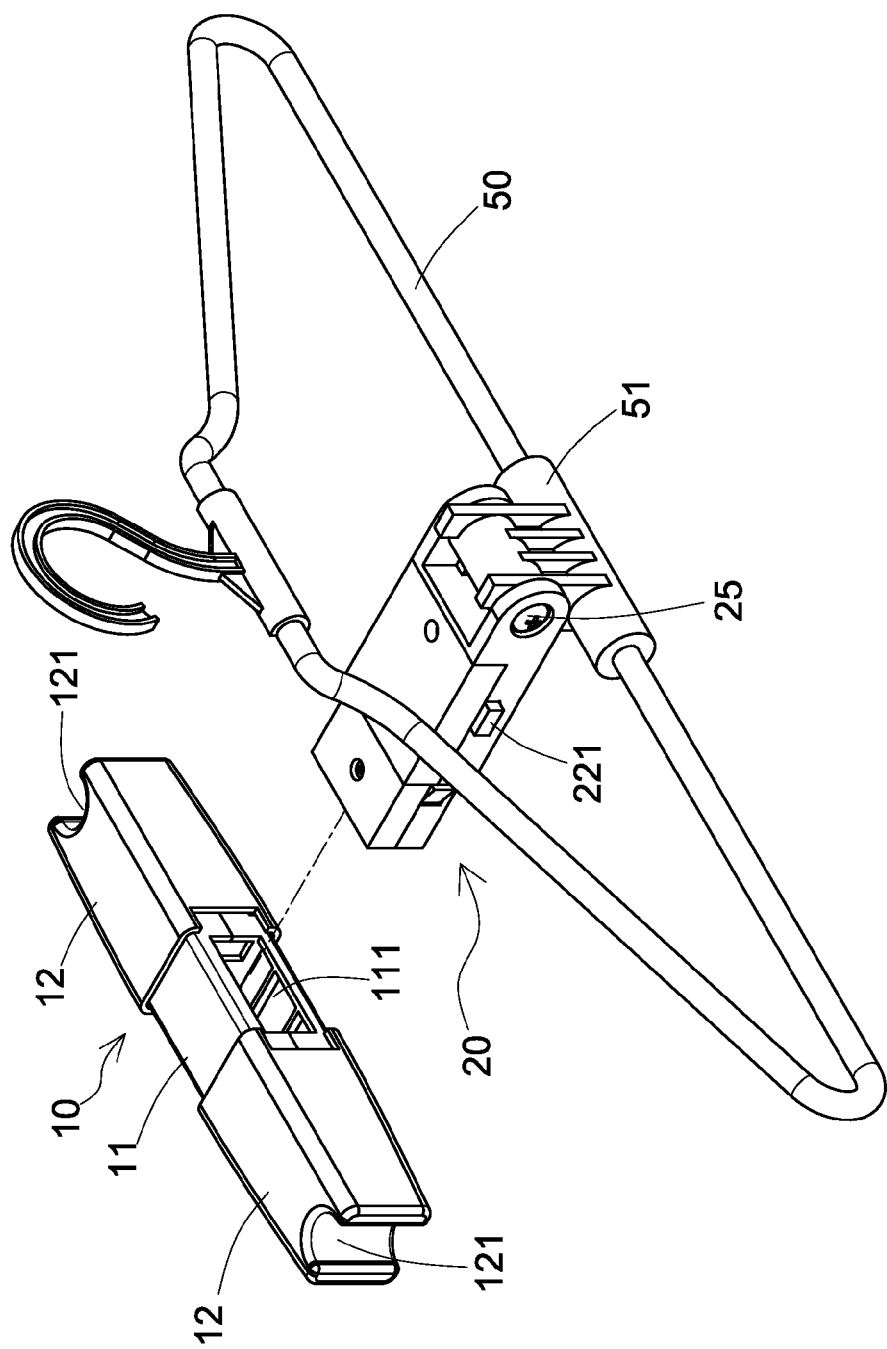
FIG. 5 is an exploded view to show that the organizer of the seat back hanger adapter of the present invention is a hanger.

As shown in FIG. 5, the organizer is a hanger 50 which has a sleeve 51, the sleeve 51 is pivotably connected to the pin 25.

Figure 6:
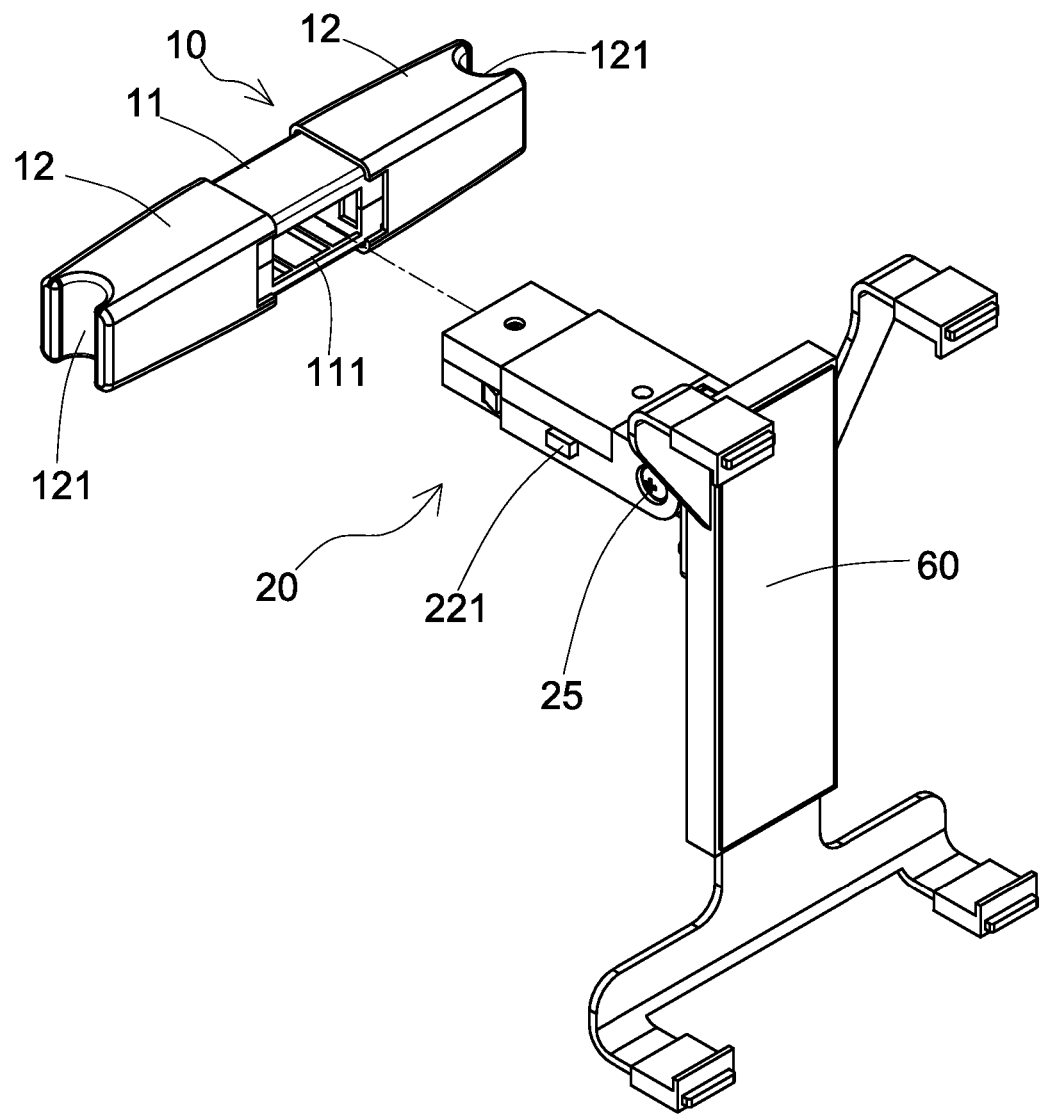
FIG. 6 is an exploded view to show that the organizer of the seat back hanger adapter of the present invention is an electronic product rack.

As shown in FIG. 6, the organizer is an electronic product rack 60 which is pivotably connected to the pin 25.

When in use, the securing unit 10 is connected between the two headrest support rods 41 of the headrest 40 by engaging the two headrest support rods 41 with the two reception spaces 121 of the two end caps 12. The two end caps 12 are biased by the two first resilient members 13 so that the securing unit 10 is well positioned. The connection unit 20 is then inserted into the opening 111 of the main part 11, wherein the two hooking portions 222 are engaged with the reception notches 112 in the main part 11 so that the connection unit 20 is connected to the securing unit 10 as shown in FIG. 4.

Figure 4:
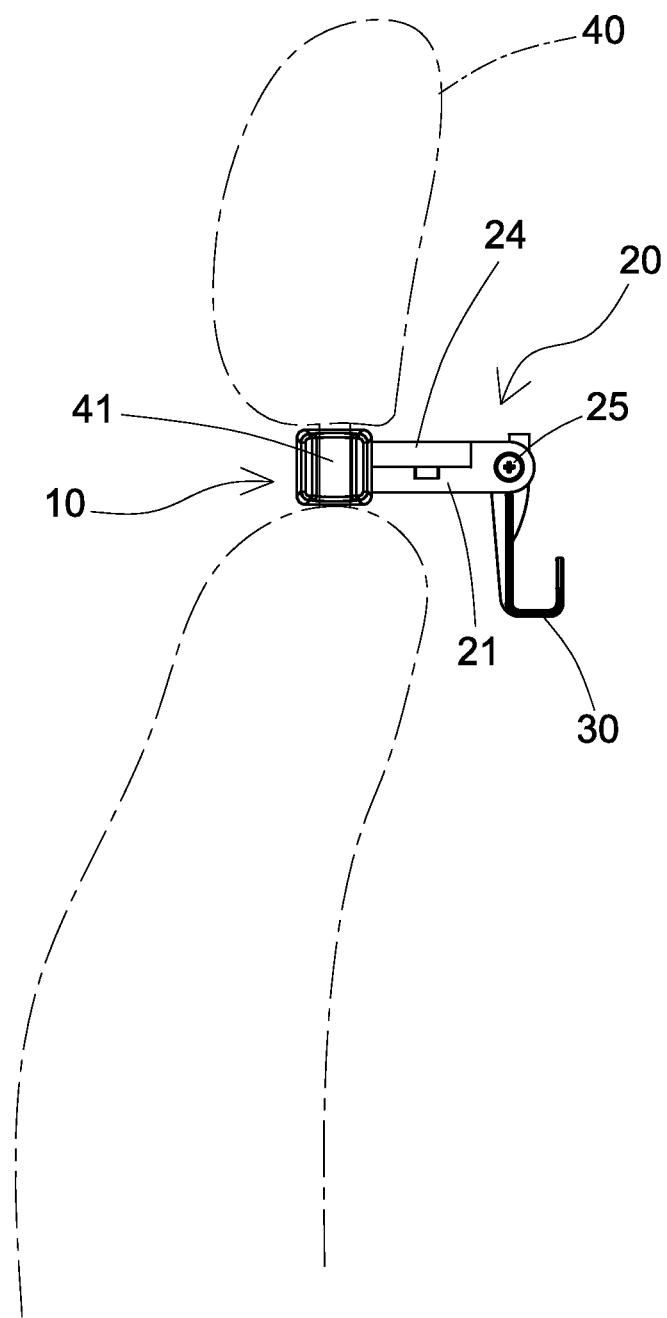
FIG. 4 is a side view to show that the organizer of the seat back hanger adapter of the present invention is a hook, and the seat back hanger adapter is connected to the back of the seat.

The hook 30 is used to hang bags at the back of the front seat as shown in FIGS. 3 and 4. When the organizer is the hanger 50 as shown in FIG. 5, clothes can be hanged on the hanger 50. When the organizer is the electronic product rack 60 as shown in FIG. 6, a smartphone and a planar is supported by the electronic product rack 60.

When separating the connection unit 20 from the securing unit 10, the user simply pushes the buttons 221 to move the two connection members 22 inward, so that the hooking portions 222 are separated from the reception notches 112. The connection unit 20 is easily separated from the securing unit 10.

While we have shown and described the embodiment in accordance with the present invention, it should be clear to those skilled in the art that further embodiments may be made without departing from the scope of the present invention.

What is claimed is:

1. A seat back hanger adapter comprising:
a securing unit having a main part, two end caps and two first resilient members, the main part being a hollow part and having an opening defined in one side thereof, the main part having two interior boards located therein and each interior board having a reception notch, each of two ends of the main part having two protrusions respectively extending from two sides thereof, the two end caps each having a reception space defined in an outer end thereof, the inner end of each end cap being an open end and mounted to one of the two ends of the main part, each open end of each end cap having two dents respectively defined in two insides thereof so as to accommodate the two protrusion of the main part, the two first resilient members respectively located between the two ends of the main part and the two end caps which are biased by the two first resilient members;
a connection unit having a base which has a first notch and a second notch defied in each of two sides thereof, two connection members located in the connection unit and each connection member having a button and a hooking portion, a second resilient member biased between the two connection members, the two respective buttons of the two connection members protruding from the two respective first notches, the two respective hooking portions of the two connection members respectively engaged with the second notches, a top board connected to a top of the base, the connection unit inserted into the opening of the main part, the hooking portions hooked with the reception notches of the main part, and
an organizer pivotably connected to the connection unit, wherein the main part includes a first part and a second part, the first part has a first recess defined in one side thereof, the second part has a second recess defined in one side thereof, the first part is connected to the second part, the first and second recesses are cooperated to form the opening,
wherein the first and second parts each have a semi-circular tubular portion extending from each of two ends thereof, the semi-circular tubular portions are cooperated with each other to form a tube on each of the two ends of the main part, two ends of the first resilient member are mounted to the two tubes.

* * * * *